(12) United States Patent
Gretz et al.

(10) Patent No.: US 7,080,859 B1
(45) Date of Patent: Jul. 25, 2006

(54) RAIN TIGHT FITTING FOR METAL TUBING

(75) Inventors: Thomas J. Gretz, Clarks Summit, PA (US); John Ofcharsky, Olyphant, PA (US)

(73) Assignee: Arlington Industries, Inc., Scranton, PA (US)

( * ) Notice: Subject to any disclaimer, the term of this patent is extended or adjusted under 35 U.S.C. 154(b) by 2 days.

(21) Appl. No.: 10/914,002

(22) Filed: Aug. 6, 2004

(51) Int. Cl.
*F16L 47/00* (2006.01)

(52) U.S. Cl. .............. 285/249; 285/154.4; 285/151.1

(58) Field of Classification Search ............ 285/249, 285/255, 334.2, 149.1, 154.1, 154.3, 154.4
See application file for complete search history.

(56) References Cited

U.S. PATENT DOCUMENTS

| | | | | |
|---|---|---|---|---|
| 1,809,582 A * | 6/1931 | Church | ................ | 285/340 |
| 2,100,796 A * | 11/1937 | Church | ................ | 285/340 |
| 2,118,672 A * | 5/1938 | Green | ................ | 285/149.1 |
| 2,255,673 A * | 9/1941 | McDermett | ........... | 285/382.7 |
| 2,542,583 A * | 2/1951 | Shea, Jr. | ............... | 285/149.1 |
| 2,630,339 A * | 3/1953 | Appleton | ............ | 285/154.1 |
| 2,737,403 A * | 3/1956 | Ellis | ................ | 285/334.2 |
| 2,986,409 A * | 5/1961 | Weber | ............ | 285/154.3 |
| 3,368,831 A * | 2/1968 | Phillipps | ............ | 285/249 |
| 3,437,357 A * | 4/1969 | Rubin | ............ | 285/55 |
| 3,448,430 A * | 6/1969 | Kelly | ............ | 439/610 |
| 3,567,843 A * | 3/1971 | Collins et al. | ........ | 285/151.1 |
| 3,647,934 A * | 3/1972 | Hurtt | ............ | 285/140.1 |
| 3,667,783 A * | 6/1972 | Sotolongo | ............ | 285/151.1 |
| 3,972,547 A * | 8/1976 | Itoya | ............ | 285/341 |
| 4,008,911 A * | 2/1977 | Kiyooka et al. | ........ | 285/249 |
| 4,030,741 A * | 6/1977 | Fidrych | ............ | 285/149.1 |
| 4,062,574 A | 12/1977 | Scholin | | |
| 4,310,185 A | 1/1982 | Bartholomew | | |
| 4,371,172 A * | 2/1983 | de Vienne | ............ | 285/343 |
| 4,547,623 A * | 10/1985 | Van Brunt et al. | ....... | 285/149.1 |
| 4,606,562 A * | 8/1986 | Saraceno | ............ | 285/149.1 |
| 4,676,533 A * | 6/1987 | Gerondale | ............ | 285/139.2 |
| 4,983,784 A * | 1/1991 | Whitlock | ............ | 285/154.1 |
| 5,059,747 A * | 10/1991 | Bawa et al. | ........... | 174/65 SS |
| 6,095,571 A | 8/2000 | MacDuff | | |
| 6,450,550 B1 | 9/2002 | Cornwell | | |

* cited by examiner

*Primary Examiner*—David Bochna

(57) ABSTRACT

A rain tight fitting for connecting electrical metal tubing to a panel. The rain tight fitting includes a tubular body having an inner bore and a rearward end. A threaded outer periphery and a seal ring seat are included on the rearward end. A seal ring is disposed against the seal ring seat and a compression ring against the seal ring. A compression nut is threaded upon the rearward end and tightened thereon to force the seal ring tightly into the seal ring seat and against the outer periphery of the metal tubing. An effective rain tight seal is formed by the close tolerances between the inner periphery of the seal ring and the outer periphery of the metal tubing and by the hardness of the seal ring.

10 Claims, 6 Drawing Sheets

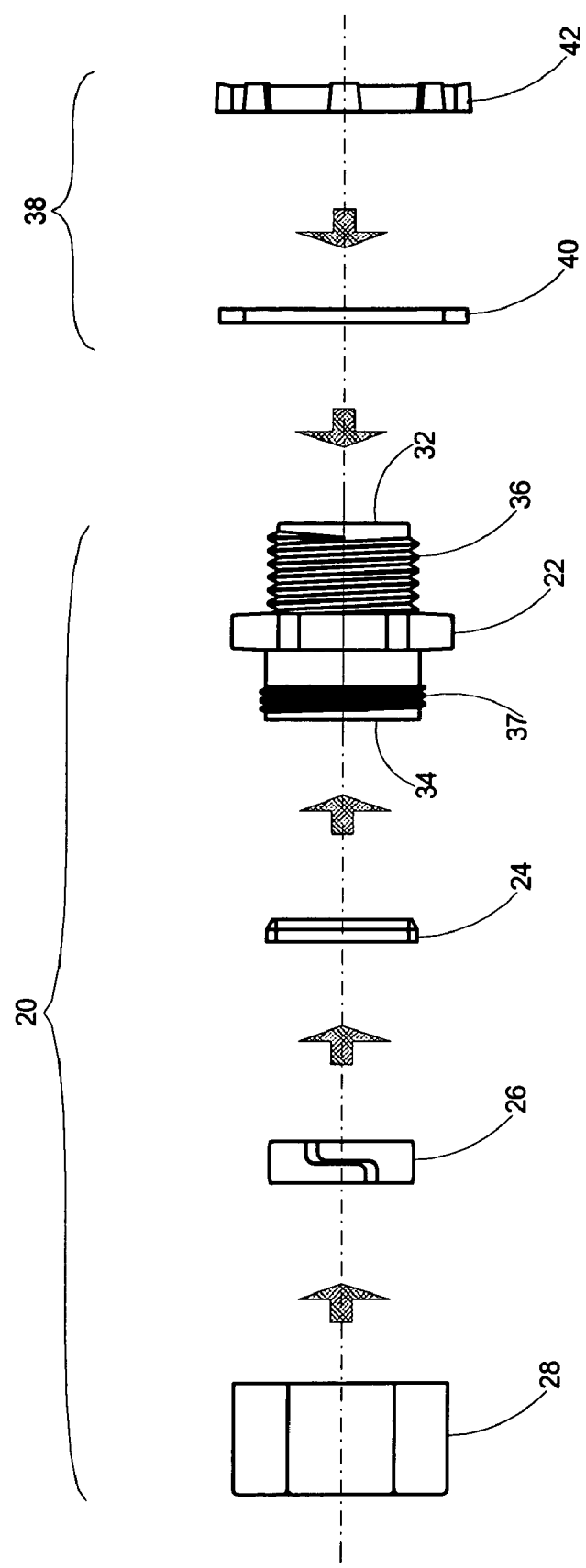

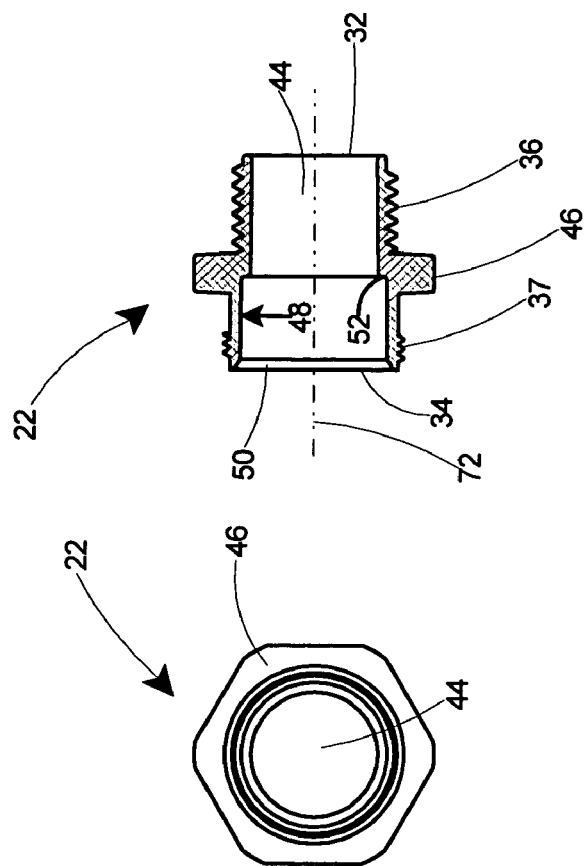
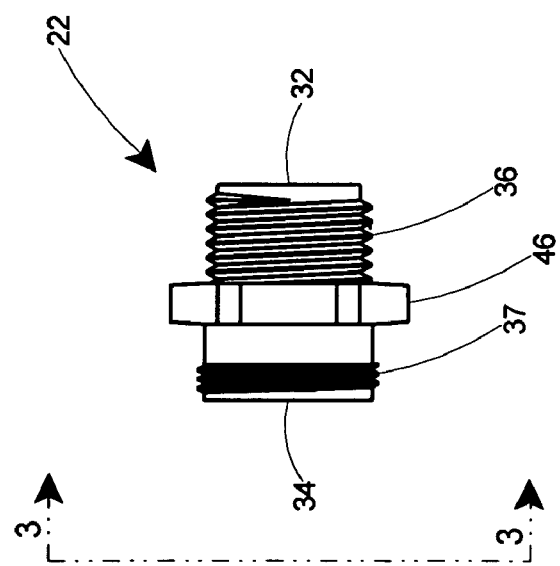
Fig. 4
Fig. 3
Fig. 2

RAIN TIGHT FITTING FOR METAL TUBING

FIELD OF THE INVENTION

The invention relates to fittings for conduit and specifically to a fitting for joining metal tubing to junction boxes or panels in a rain tight fit.

BACKGROUND OF THE INVENTION

Electrical metal tubing (EMT) is frequently employed as conduit for electrical wiring. The EMT is supplied in standard lengths, and, when being installed in an outdoor location, many connections typically must be made between the ends of the conduit and between the conduit and any electrical panels or electrical housings it is connected to.

Various connectors and fittings have been proposed to join two ends of conduit or tubing. Typically, the prior art proposes the use of an elastomeric seal, such as an O-ring to achieve a rain tight or liquid tight fit. U.S. Pat. No. 6,450,550 for example, discloses a fitting including an elastomeric seal that is mounted within the main cavity of the fitting. The inner diameter and outer diameter of the seal cause the seal to be compressed between the tubing and the wall of the main cavity.

U.S. Pat. No. 6,095,571 discloses a tubing connector for sealingly engaging an end portion of a tubing. An elastic seal ring is provided in each of two annular spaced apart grooves in an external periphery of a connector portion of the tubing connector. The elastic seal rings are preferably O-rings.

U.S. Pat. No. 4,310,185 discloses a quick connector that includes an O-ring seal positioned at each end of the sleeve and over each tubing end portion with an inner clamping sleeve, outer clamping sleeve, and locking sleeve.

U.S. Pat. No. 4,062,574 discloses a fitting assembly that includes a plurality of bores of increasing diameters in which a sealing ring in one bore is held in position by a retaining ring in another bore and a retainer member in the other bore holds the sealing ring and retaining ring in place.

Although all of the above prior art fittings claim to achieve a rain or liquid tight fit, they all rely upon the seal being created by one or more elastomeric O-rings held within the fitting. Typically the fitting includes one or more annular grooves machined within the inner cylindrical wall of the fitting to hold the elastomeric O-ring in place. Since the O-rings are elastomeric, they are elastic and function only to seal the outer periphery of the tubing against leaks. Being elastic, the O-rings do not function to hold the tubing in place within the fitting. Typically, the prior art fittings employ separate retainer rings or similar devices to hold the tubing in place within the fitting.

Prior art rain tight fittings for tubing, as a consequence of the reliance on one or more elastomeric O-rings and the machining required to form a groove for the O-rings, tend to be complex mechanically. Additionally, the elastomeric O-rings lose their elasticity with time. In the case of EMT, which is expected to be maintenance free for the life of the building, a fitting employing elastomeric O-rings would be unacceptable for service life. Another disadvantage of elastomeric O-rings is that they contribute nothing to gripping and holding the tubing within the fitting.

It is therefore an object of this invention to provide a mechanically simple fitting that is capable of obtaining a long-lasting rain tight fit on metal tubing. It is furthermore an object to create a sealing member that grips and retains the outer surface of the tubing to provide strain relief and prevent the tubing from being withdrawn from the fitting.

SUMMARY OF THE INVENTION

The present invention comprises a rain tight fitting for connecting electrical metal tubing to a panel. The rain tight fitting includes a tubular body having an inner bore and a rearward end. A threaded outer periphery and a seal ring seat are included on the rearward end. A seal ring is disposed against the seal ring seat and a compression ring against the seal ring. A compression nut is threaded upon the rearward end and tightened thereon to force the seal ring tightly into the seal ring seat and against the outer periphery of the metal tubing. An effective rain tight seal is formed by the close tolerances between the inner periphery of the seal ring and the outer periphery of the metal tubing and by the hardness of the seal ring. In a preferred embodiment, the seal ring has a Rockwell R Hardness of between 110 and 120.

DESCRIPTION OF THE DRAWINGS

FIG. 1 is an exploded side view of a preferred embodiment of a rain tight fitting according to the present invention.

FIG. 2 is a side view of a tubular body member which forms a portion of the rain tight fitting of FIG. 1.

FIG. 3 is an end view of the tubular body member taken along line 3—3 of FIG. 2.

FIG. 4 is a sectional view of the tubular member taken along line 4—4 of FIG. 2.

Figures 5, 6:
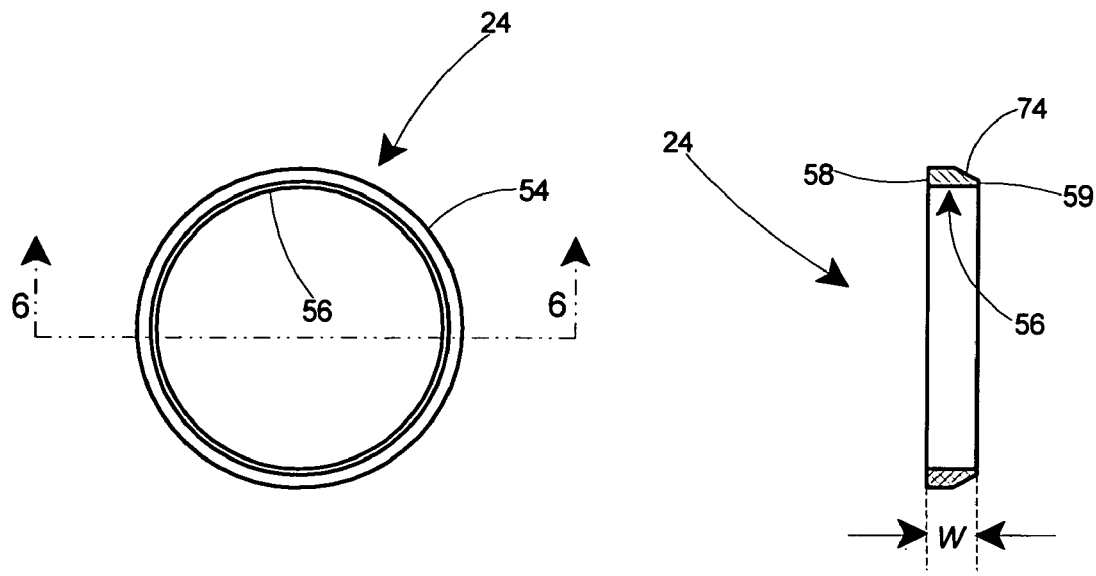
FIG. 5 is a plan view of the seal ring portion of the rain tight fitting of FIG. 1.
FIG. 6 is a sectional view of the seal ring taken along line 6—6 of FIG. 5.

| | Table of Nomenclature | |
|---|---|---|
| 22) | Part No. | Part Description |
| | 20 | rain tight fitting |
| | 22 | tubular body member |
| | 24 | seal ring |
| | 26 | compression ring |
| | 28 | compression nut |
| | 32 | forward end |
| | 34 | rearward end |
| | 36 | external threads on forward end |
| | 38 | fastening arrangement |
| | 40 | gasket |
| | 42 | internally threaded nut |
| | 44 | central bore in tubular body |
| | 46 | outer flange |
| | 48 | inner periphery of forward end |
| | 50 | seal ring seat |
| | 52 | stop |
| | 54 | outer periphery of seal ring |
| | 56 | inner periphery of seal ring |
| | 58 | trailing edge of seal ring |
| | 59 | leading edge of seal ring |
| | 60 | internal threads on compression nut |
| | 62 | hexagon-shaped surface |

-continued

Table of Nomenclature

| 22) | Part No. | Part Description |
|---|---|---|
| | 64 | inner periphery of compression nut |
| | 66 | camming surface |
| | 68 | metal tubing |
| | 70 | beveled surface of seal ring seat |
| | 72 | central axis of tubular body |
| | 74 | beveled surface of seal ring |
| | 75 | leading edge of compression ring |
| | 76 | inner edges of compression ring |
| | 78 | outer periphery of tubing |
| | 80 | second embodiment of rain tight fitting |
| | 82 | tubular body of second embodiment |
| | 84 | annular ring |

DESCRIPTION OF THE INVENTION

With reference to FIG. 1, there is depicted a first and preferred embodiment of a rain tight fitting 20 for connecting metal tubing to a panel. The rain tight fitting includes a tubular body member 22, a seal ring 24, a compression ring 26, and a compression nut 28. The tubular body includes a forward end 32, a rearward end 34, external threads 36 on the forward end 32, and external threads 37 on the rearward end 34. A fastening arrangement 38 can be threaded on the forward end 32 to secure the fitting 20 to a panel or the wall of an electrical box (not shown). The fastening arrangement 38 includes a gasket 40 and an internally threaded nut 42.

Referring to FIGS. 2–4, the tubular body 22 includes a central bore 44, an outer flange 46, and external threads 37 on the rearward end 34. The forward end 32 of the tubular body 22 includes an inner periphery 48, a seal ring seat 50, and a stop 52. 25) As shown in FIGS. 5 and 6, the seal ring 24 is a continuous ring having an outer periphery 54, an inner periphery 56, a trailing edge 58, and a leading edge 59. The seal ring 24 is preferably formed of plastic and has a Rockwell R Hardness between 110 and 120. The seal ring 24 is preferably constructed of polycarbonate. Preferably the width W of the seal ring 24 is 0.25 inch or greater, the minimum width of the seal ring 24 being critical to insure an adequate grip is caused when the compression nut 28 is tightened upon the tubular body 22.)

Figures 7, 8:
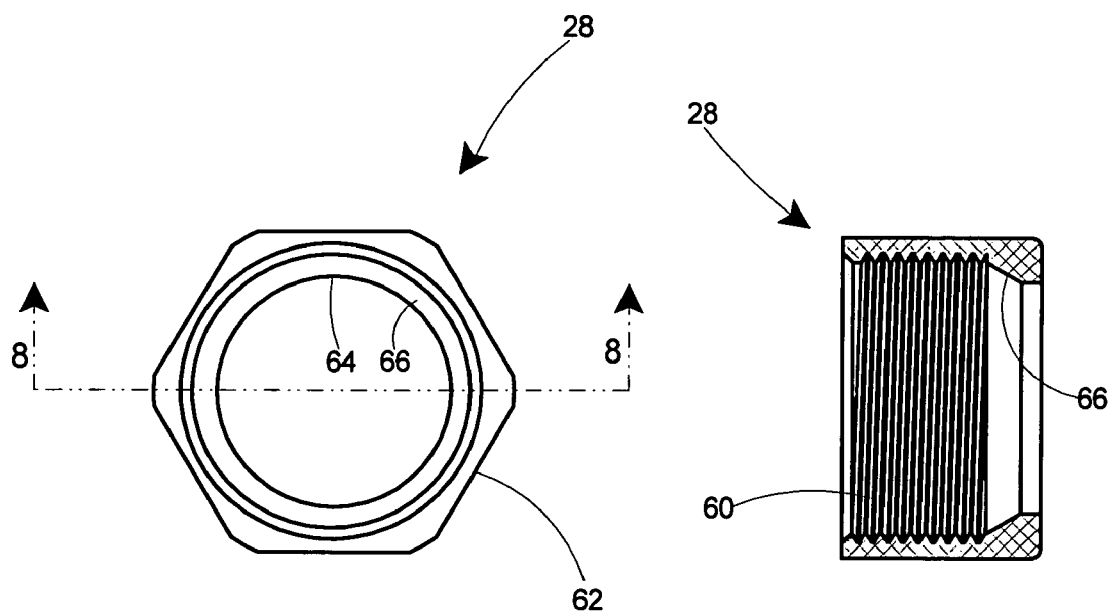
FIG. 7 is a plan view of a compression nut that forms part of the rain tight fitting of FIG. 1.
FIG. 8 is a sectional view of the compression nut taken along line 8—8 of FIG. 7.

The a compression nut 28, as shown in FIGS. 7–8, preferably includes internal threads 60, a hexagon-shaped surface 62 to enable grasping with a wrench or similar tool, and an inner periphery 64. A camming surface 66 is included on the inner periphery 64.)

Figure 9:
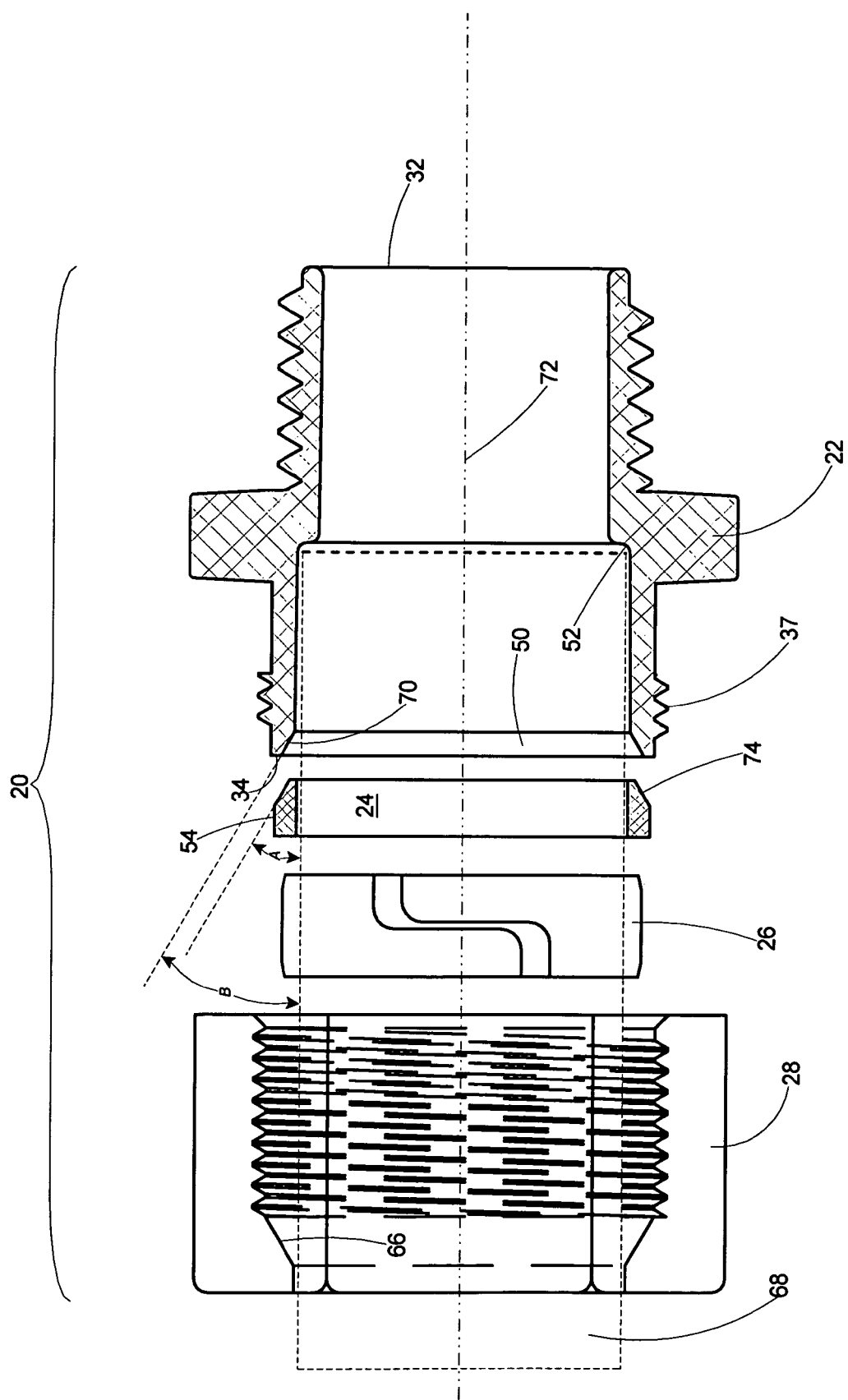
FIG. 9 is a sectional view of the rain tight fitting of FIG. 1 with the various pieces assembled but in an uncompressed state.

With reference to FIG. 9, the fitting 20 is depicted in an exploded state with a portion of metal tubing 68 inserted into the rearward end 34. Although shown in an exploded state, when being used to fasten metal tubing to a panel (not shown), the rearward end 34 of the fitting 20 does not require disassembly. Loosening of the compression nut 28 on the rearward threads 37 causes the camming surface 66 to release pressure on the compression ring 26 thereby allowing the compression ring 26, which is preferably a split ring, to expand in diameter to its unbiased state. The tubing 68 can then be slipped through the compression nut 28, compression ring 26, and seal ring 24 and into the rearward end 34 of the fitting until the forward travel of the tubing 68 is arrested by the stop 52. The compression nut 28 can then be tightened on the threaded rearward end 34 to secure the tubing 68 to the tubular body 22 in a rain-tight fit. As shown in FIG. 9, the seal ring seat 50 includes a beveled surface 70 that is preferably at an angle of 30° (angle B in FIG. 9) with respect to the central axis 72 through the tubular body 22. The outer periphery 54 of the seal ring 24 includes a beveled surface 74 that is also preferably at an angle of 30° (angle A in FIG. 9) with respect to the central axis 72 through the tubular body 22.)

Figure 10:
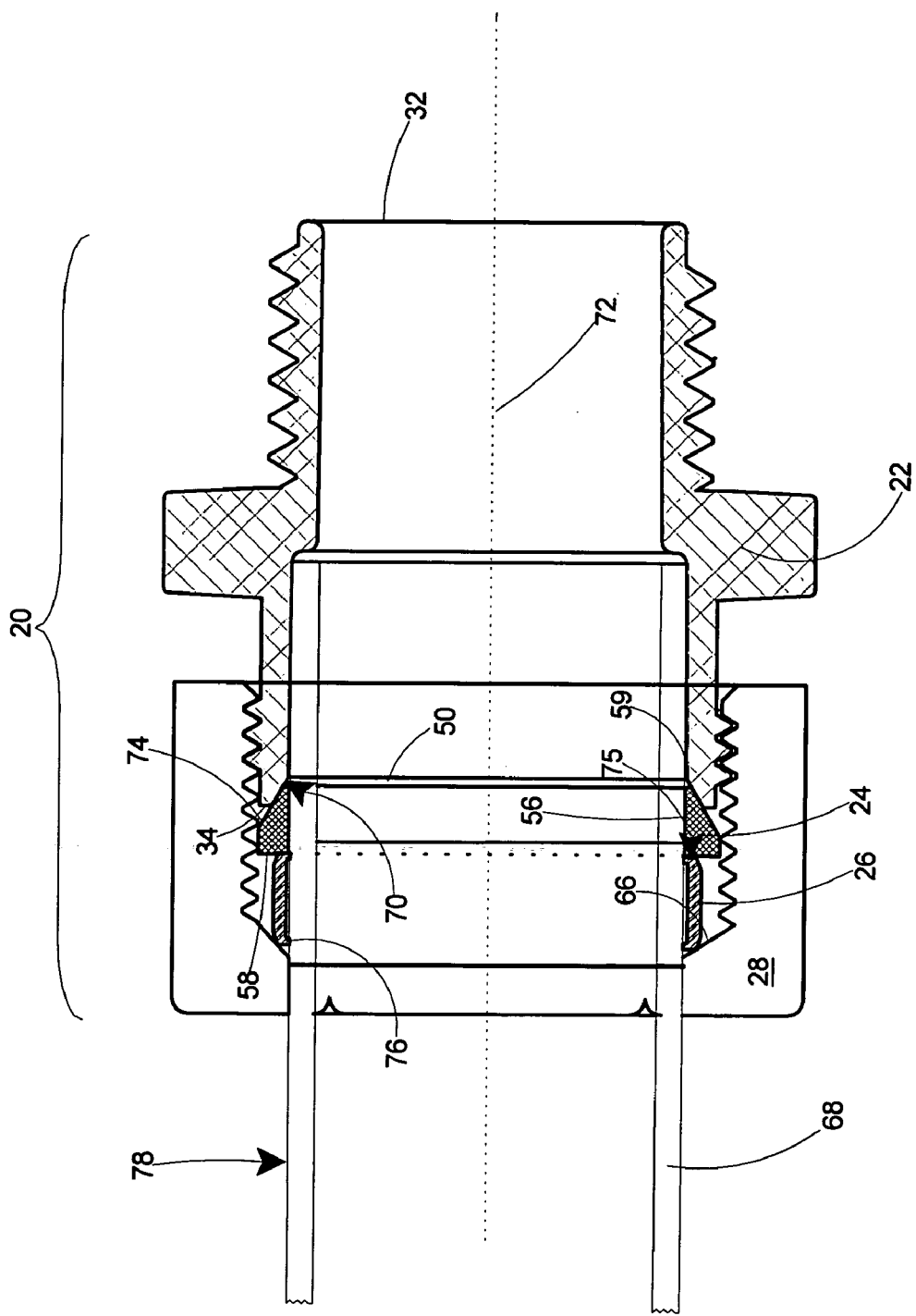
FIG. 10 is a sectional view of the rain tight fitting of FIG. 9 in a compressed state.

Referring to FIG. 10, to lock the tubing 68 into the fitting 20 in a rain-tight fit, the compression nut 28 is threaded upon the rearward end 34 of the tubular body 22. As the compression nut 28 is threaded upon the rearward end 34, the camming surface 66 of the compression nut 28 engages the compression ring 26 and forces it to make contact with the trailing edge 58 of the seal ring 24. Continued tightening of the compression nut 28 causes the leading edge 75 of the compression ring 26 to exert continued pressure on the trailing edge 58 of the seal ring 24 forcing the beveled surface 74 of the seal ring 24 against the beveled surface 70 of the seal ring seat 50. Once tightened, the beveled surface 74 of the seal ring 24 is held in intimate contact with the beveled surface 70 of the seal ring seat 50 thereby providing a rain-tight fit. Tightening of the compression nut 28 upon the rearward end 34 of the tubular body 22 causes the inner periphery 56 of the seal ring 24 to collapse in diameter until the inner periphery 56 of the seal ring 24 is in firm contact with the outer periphery 78 of the metal tubing thereby holding the metal tubing 68 firmly within the fitting 20. The rain-tight fit is caused by the compression of the inner periphery 56 of the seal ring 24 against the outer periphery of the tubing 68 and the compression of the beveled surface 74 of the seal ring 24 against the beveled surface 70 of the seal ring seat 50. The seal ring 24, being constructed of a hard plastic having a Rockwell R Hardness between 110 and 120, also exerts a strong force against the tubing 68 thereby holding the tubing 68 within the fitting 20 and providing strain relief so that the tubing 68 is not easily withdrawn from the fitting 20. The compression ring 26 also includes inner edges 76 that are pressed into the outer periphery 78 of the tubing 68 to further grip the tubing and hold it within the fitting 20.

Although the seal ring 24 of the present invention is constructed of a hard plastic, under the tight tolerances of the fitting 20 and compression nut 28 the seal ring 24 is kept restrained by the compression nut 28 and tubular body 22 as the compression nut is threaded upon the rearward end 34. Continued tightening of the compression nut 28 causes the inner periphery 56 of the seal ring 24 to be deformed against the outer periphery 78 of the tubing 68. The seal ring 24 is therefore manufactured to a tight tolerance such that the inner periphery of the seal ring 24 is no more than 0.014 inch greater than the outer periphery of the metal tubing 68. The tolerance between the compression nut 28 and seal ring 24 is also critical to keep the outer periphery 54 of the seal ring 24 constrained as the compression nut 28 is tightened upon the tubular body 22. The internal threads of the compression nut 28 therefore have a minor diameter that is 0.004 inch or less than the outer periphery 54 of the seal ring 24.)

The end result is a fitting that is mechanically simple and eliminates the use of elastomeric seals or O-rings to achieve a rain-tight fit. The fitting of the present invention therefore eliminates the inherent problem of prior art fittings of the elastomeric seals losing their elasticity with the passage of time. The present invention therefore provides a rain-tight fitting with a vastly improved service life. As a result of grooves not being needed in the fitting for holding an O-ring, the fitting has the advantage of being simpler mechanically, and therefore more cost effective to produce. The fitting also has the advantage of providing a sealing member that grips and retains the outer surface of the tubing to provide strain relief and prevent the tubing from being withdrawn from the fitting.

Figure 11:
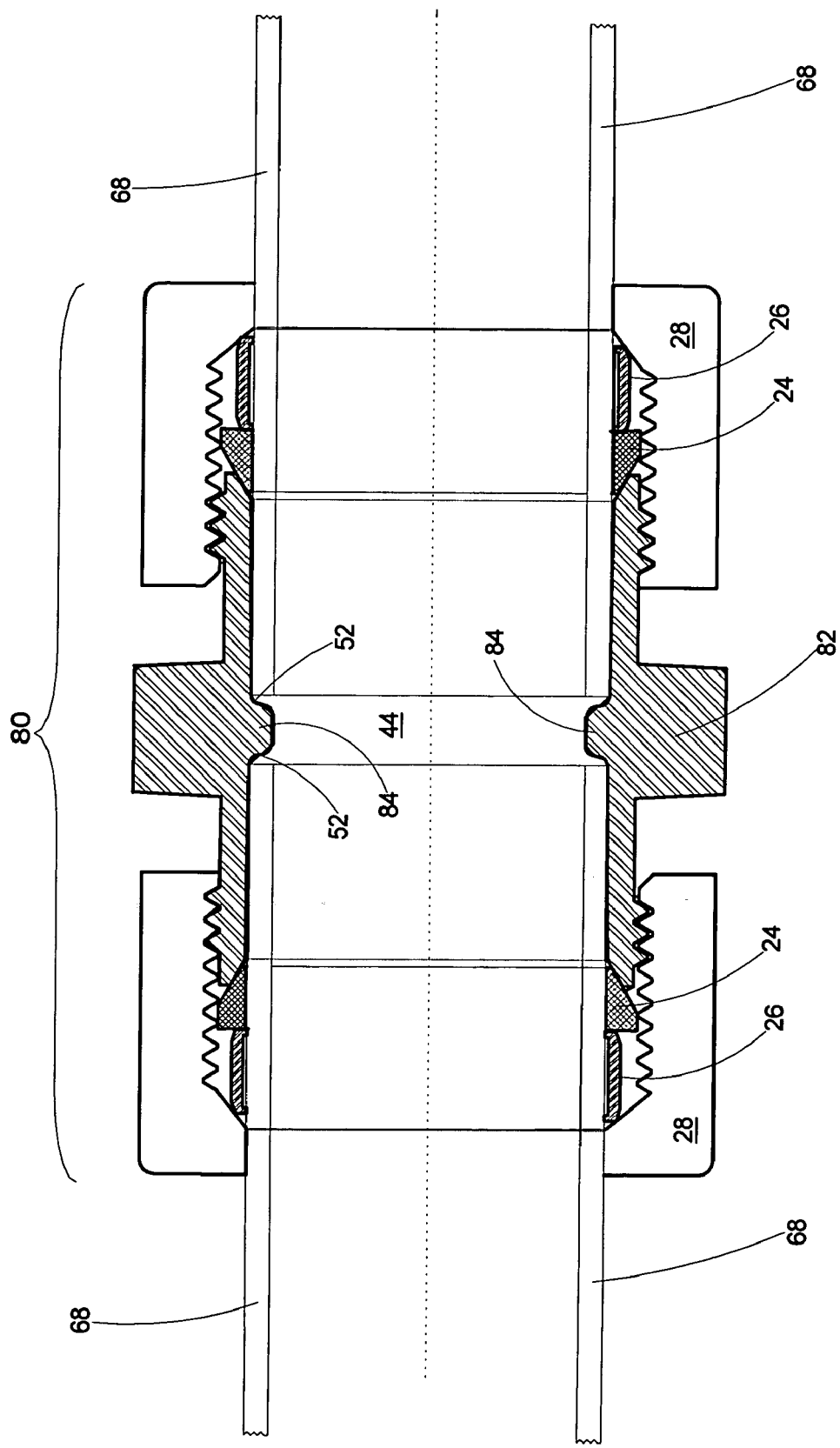
FIG. 11 is a sectional view of an alternate embodiment of the rain tight fitting in a compressed state.

Referring to FIG. 11, a second embodiment is shown of a rain-tight fitting 80 according to the present invention. This embodiment of the rain-tight fitting 80 is used to joint two ends of tubing 68 in a rain-tight fit. Each end of the fitting 80 is similar to the rearward end 34 of the first embodiment of the rain-tight fitting 20 shown in FIG. 1. The tubular body 82 of the second embodiment includes an annular ring 84 that extends into the central bore 44 in the tubular body 82 to form two stops 52. An end of tubing can be inserted in each end of the fitting 80. By tightening the compression nuts 28 upon each end, a rain-tight fitting is thereby created between the two ends of tubing.

Although the description above contains many specifics, these should not be construed as limiting the scope of the invention but as merely providing illustrations of a preferred embodiment of the rain tight fitting of this disclosure. Typical sizes are provided to illustrate a given embodiment of the present invention and should not be construed as limiting its scope.

Thus the scope of the invention should be determined by the appended claims and their legal equivalents, rather than by the specific examples given.

What is claimed is:

1. A rain tight fitting for connecting tubing to a panel comprising:
    a tubular body member including a forward end, a rearward end having an inner periphery, and external threads on said rearward end;
    a compression nut internally threaded to engage said external threads on said rearward end of said tubular body member;
    a seal ring seat on said inner periphery of said rearward end;
    a seal ring disposed against said seal ring seat, said seal ring a continuous ring having an inner periphery, an outer periphery, and a trailing edge, said seal ring formed of plastic having a Rockwell R Hardness between 110 and 120;
    said tubing includes an outer periphery;
    said inner periphery of said seal ring is greater than said outer periphery of said tubing;
    a compression ring disposed against said first seal ring, said compression ring a split ring having a leading edge; and
    said leading edge of said compression ring engaging said trailing edge of said seal ring;
    wherein tightening of said compression nut upon said rearward end of said tubular body member causes said inner periphery of said seal ring to collapse in diameter until said inner periphery of said seal ring is in firm contact with said outer periphery of said tubing thereby holding said tubing firmly within said fitting.

2. The rain tight fitting of claim 1 including a fastening arrangement on said forward end of said tubular body member for securing said fitting to said panel.

3. The rain tight fitting of claim 2 wherein said fastening arrangement includes external threads on said forward end of said tubular body, a gasket around said forward end, and a nut internally threaded to engage said external threads on said forward end.

4. The rain tight fitting of claim 1 wherein said inner periphery of said seal ring is no more than 0.014 inch greater than said outer periphery of said metal tubing.

5. The rain tight fitting of claim 1 wherein said seal ring seat includes a beveled surface on said inner periphery of said rearward end of said tubular body member.

6. The rain tight fitting of claim 5 wherein
    said seal ring and said tubular body member include a central axis;
    said seal ring includes a leading edge;
    said outer periphery of said leading edge of said seal ring includes a beveled surface; and
    said beveled surface on said outer periphery of said seal ring and said beveled surface on said inner periphery of said tubular body member are at an angle of 30 degrees with respect to said central axis.

7. The rain tight fitting of claim 6 wherein tightening of said compression nut upon said rearward end of said tubular body member causes said leading edge of said compression ring to engage said trailing edge of said seal ring and force said beveled surface on said outer periphery of said seal ring against said beveled surface on said inner periphery of said tubular body member.

8. The rain tight fitting of claim 1 wherein said compression nut includes internal threads having a minor diameter that is 0.004 inch or less than said outer periphery of said seal ring.

9. The rain tight fitting of claim 1 wherein said seal ring is constructed of polycarbonate.

10. The rain tight fitting of claim 1 wherein said seal ring has a width of no less than 0.25 inch.

* * * * *